(12) United States Patent
Ambartsoumian (10) Patent No.: US 12,260,279 B2
(45) Date of Patent: Mar. 25, 2025

(54) LABEL WITH WIRELESS COMMUNICATION CAPABILITY FOR VIAL OR TUBE

(71) Applicant: Gourgen Ambartsoumian, Laval (CA)

(72) Inventor: Gourgen Ambartsoumian, Laval (CA)

(*) Notice: Subject to any disclaimer, the term of this patent is extended or adjusted under 35 U.S.C. 154(b) by 0 days.

(21) Appl. No.: 18/060,778

(22) Filed: Dec. 1, 2022

(65) Prior Publication Data

US 2023/0177303 A1 Jun. 8, 2023

Related U.S. Application Data

(60) Provisional application No. 63/285,778, filed on Dec. 3, 2021.

(51) Int. Cl.
| | | |
|---|---|---|
| G06K 19/06 | (2006.01) | |
| A01N 1/147 | (2025.01) | |
| B32B 7/12 | (2006.01) | |
| B65C 3/02 | (2006.01) | |
| B65C 9/46 | (2006.01) | |
| G06K 19/077 | (2006.01) | |

(52) U.S. Cl.
CPC ......... *G06K 19/0776* (2013.01); *A01N 1/147* (2025.01); *B32B 7/12* (2013.01); *B65C 3/02* (2013.01); *B65C 9/46* (2013.01); *B32B 2307/412* (2013.01); *B32B 2307/732* (2013.01); *B32B 2307/75* (2013.01); *B32B 2519/00* (2013.01)

(58) Field of Classification Search
CPC ........... G06K 19/0716; G06K 19/0776; G06K 7/10316; G06K 19/0723; B32B 7/12; B32B 2307/748; B32B 2405/00; B65C 3/02; B65C 9/46; A01N 1/0268; A01N 1/0257; A01N 1/0273
USPC .................................................. 235/492, 385
See application file for complete search history.

(56) References Cited

U.S. PATENT DOCUMENTS

| | | | |
|---|---|---|---|
| 7,108,909 B1 | 9/2006 | Perlman | |
| 10,577,138 B2 | 3/2020 | Ambartsoumian | |
| 10,762,308 B1* | 9/2020 | Ambartsoumian | .. A01N 1/0242 |
| 2017/0337852 A1 | 11/2017 | Oster | |
| 2021/0065363 A1* | 3/2021 | Gordon | .................. H04N 23/56 |
| 2021/0121876 A1* | 4/2021 | Blair | ..................... B01L 3/5029 |
| 2022/0108146 A1* | 4/2022 | Bixon | ................ G06K 7/10386 |

FOREIGN PATENT DOCUMENTS

CN 102 099 845 A 6/2011

* cited by examiner

*Primary Examiner* — Daniel St. Cyr
(74) *Attorney, Agent, or Firm* — NORTON ROSE FULBRIGHT CANADA LLP (57) ABSTRACT

A label for a tube having a diameter D may have a transparent facestock. A printing area is defined on a first surface of the transparent facestock, the printing area configured to receive data thereon, the printing area covering only a portion of the transparent facestock, whereby a shielding portion of the length of the label is transparent. An adhesive layer is on a second surface of the facestock. A wireless communication inlay is adhered to the adhesive layer in a portion of the label corresponding to the printing area. The printing area and the facestock are sized for the shielding portion to overlap at least partially the printing area when the label is wrapped on a tube.

20 Claims, 8 Drawing Sheets

LABEL WITH WIRELESS COMMUNICATION CAPABILITY FOR VIAL OR TUBE

TECHNICAL FIELD

The present application relates to labels with wireless communication capability for use with small diameter tubing, tubes or vials, such as for use in cryogenic storage and/or with exposure to chemicals and solvents, as well as tubes and tubing for liquid, air and gas transport.

BACKGROUND

It is known to use electronic chips in labels for laboratory and clinical uses, among other possible uses, to facilitate the identification and tracking of the content of a sample container of any appropriate type. Labels with chips integrating Radio Frequency Identification (herein RFID) are commonly used, notably for the capacity of such chips to be used in cryogenic conditions. Other electronic identification technologies include Near Field Communication (herein NFC), as an example among others.

Commonly used containers have cylindrical shapes, such as vials, microtubes, microcentrifuge tubes, matrix tubes, cryogenic vials, PCR tubes, cryogenic in vitro fertilization (IVF) straws, hollow cylindrical tubes and tubings, combined cryo containers, and others. These containers may have relatively small diameters. Therefore, when electronic chips are affixed to the cylindrical surfaces of such containers, whether directly via an adhesive layer of a casing in which the chip is inlaid (e.g., wet tag), or via a supporting label, the relative rigidity of the electronic chip may prevent it from conforming completely to the cylindrical surface. For example, RFID inlays are typically thicker than cryogenic label facestock materials. Also, the facestock materials used in cryogenic labels have much greater thermal expansion values, elongation values in machine and traverse directions compared to RFID tag inlays. When applied to a cryogenic vial, the facestock can contract along with the contraction of the vial whereas the RFID inlay alone will contract to a lesser degree. As a result, the RFID inlay may detach and flag from a vial in cryogenic storage.

SUMMARY OF THE INVENTION

It is an aim of the present disclosure to provide a novel label with electronic chip for tube or vial.

Therefore, in accordance with a first aspect of the present disclosure, there is provided a label for a tube having a diameter D, comprising: a transparent facestock; a printing area on a first surface of the transparent facestock, the printing area configured to receive data thereon, the printing area covering only a portion of the transparent facestock, whereby a shielding portion of the length of the label is transparent; an adhesive layer on a second surface of the facestock, a wireless communication inlay adhered to the adhesive layer in a portion of the label corresponding to the printing area; wherein the printing area and the facestock are sized for the shielding portion to overlap at least partially the printing area when the label is wrapped on a tube.

Further in accordance with the first aspect, for example, the printing area is a printing layer defined by opaque ink.

Still further in accordance with the first aspect, for example, a release liner is included.

Still further in accordance with the first aspect, for example, the wireless communication inlay is part of a wet tag.

Still further in accordance with the first aspect, for example, the wireless communication inlay is part of a dry tag.

Still further in accordance with the first aspect, for example, the shield portion has a length $L_2$ being $\pi D < L_2 < 3.5\pi D$.

Still further in accordance with the first aspect, for example, the printing area has a length $L_1$ being $0.8\pi D < L_1 < 1.3\pi D$.

Still further in accordance with the first aspect, for example, the labeled tube is for storage at −70 C or below.

Still further in accordance with the first aspect, for example, the labeled tube comes in contact with liquid nitrogen.

Still further in accordance with the first aspect, for example, the labeled tube comes in contact with dry ice.

Still further in accordance with the first aspect, for example, the adhesive layer is a cryogenic adhesive capable to adhere to frozen vials or vials frozen at at least −70 C.

Still further in accordance with the first aspect, for example, an elongation value of facestock is at least 20% higher than an elongation value of the wireless communication inlay.

Still further in accordance with the first aspect, for example, the release liner is a sheet having multiple ones of the label thereon.

Still further in accordance with the first aspect, for example, the release liner is a roll having multiple ones of the label thereon.

Still further in accordance with the first aspect, for example, the printing area on a first surface of the transparent facestock includes an opaque ink layer on the first surface of the transparent facestock.

Still further in accordance with the first aspect, for example, a kit may include a label as described above; and an IVF straw.

In accordance with a second aspect of the present disclosure, there is provided a method for applying a label with RF inlay onto a tube, comprising: adhering an end of a label against a cylindrical surface of a tube, the end having a printing surface and a wireless communication inlay; wrapping the label around the cylindrical surface of the tube; and applying a transparent shielding portion of the label over the end having the printing surface and the wireless communication inlay.

Further in accordance with the second aspect, for example, printing on the printing surface is performed prior to adhering the end of the label against the cylindrical surface of the tube.

Still further in accordance with the second aspect, for example, removing the label from a release liner is performed prior to adhering the end of the label against the cylindrical surface of the tube.

Still further in accordance with the second aspect, for example, adhering an end of a label against a cylindrical surface of a tube includes adhering the end of the label to a frozen tube.

BRIEF DESCRIPTION OF THE EMBODIMENTS

Figure 1:
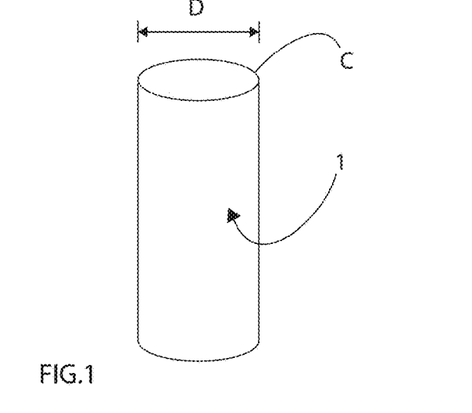
FIG. 1 is a schematic perspective view of a cylindrical body representation of a vial or tube.
Figure 12:
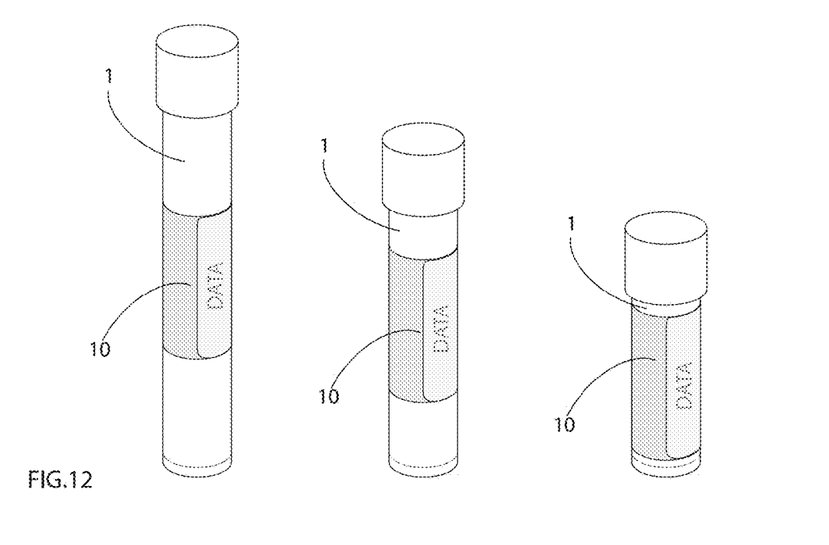
FIG. 12 is a perspective view of cryovials labeled with the label of FIG. 2.
Figure 13:
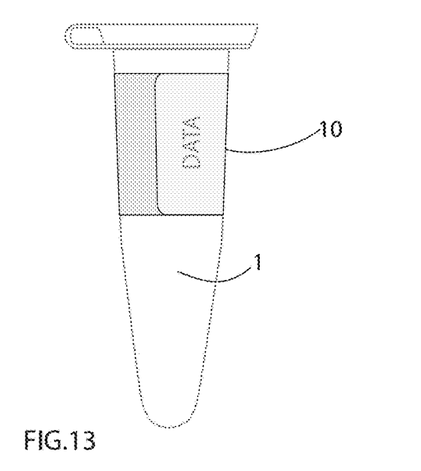
FIG. 13 is a perspective view of a microcentrifuge tube labeled with the label of FIG. 2.
Figure 14:
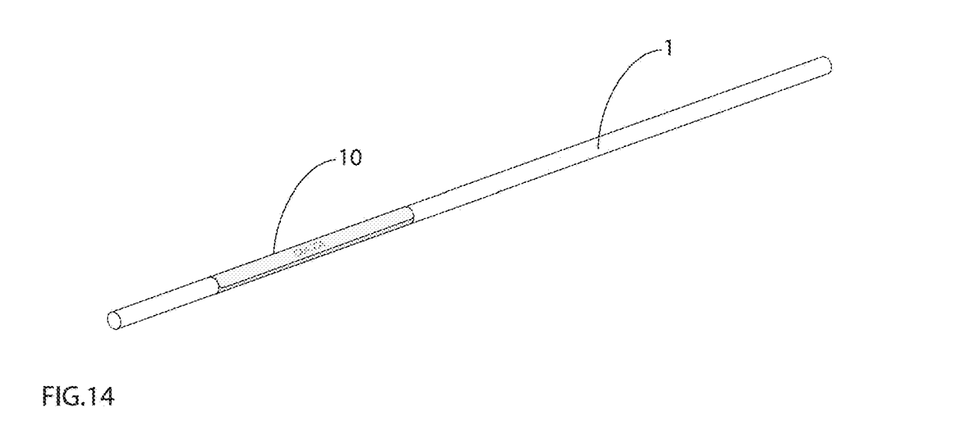
FIG. 14 is a perspective view of an IVF straw labeled with the label of FIG. 2.
Figure 15:
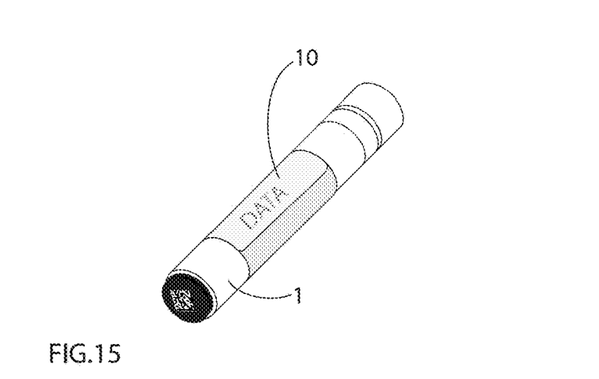
FIG. 15 is a perspective view of a matrix tube labeled with the label of FIG. 2.

Referring to the drawings and more particularly to FIG. 1, an exemplary cylindrical portion of a sample tube or vial is illustrated at 1. Reference is made herein to the vial or tube as tube 1, even though item 1 may be a vial or any other type of container. For example, the tube 1 may be a microtube, a microcentrifuge tube, a matrix tube (FIG. 15), a cryogenic vial (FIG. 12), a PCR tube or microcentrifuge tube (FIG. 13), a cryogenic in-vitro fertilization (IVF) straw (FIG. 14) such as one used in Artificial Reproductive Technologies (ART), a hollow cylindrical tubing such as blood transfusion tubing or similar, syringe, catheter, among other possibilities. The tube 1 is cylindrical in shape, with an outer diameter D usually in the range of millimeters, and a circumference C expressed as being equal to $\pi D$. In an embodiment, the cylindrical surface of the tube 1 is made of a low surface energy (LSE) plastic, though the tube may consist of other materials, such as other types of plastics, polymers, copolymers or glass or composite materials comprising a mix of materials.

The tube 1 may be open ended so as to receive a sample(s) in its inner cavity. The matrix tube 1 has a bottom face, circular in shape for example, and may have a shoulder between the bottom face and a cylindrical side surface thereof. In the illustrated embodiment, the outside diameter D of tube 1 may be of around 10.0 mm, though other diameters are contemplated. In a variant, the outside diameter ranges from 2.0 mm and 16.0 mm, inclusively. In another variant, the outside diameter ranges from 5.0 mm and 12.5 mm, inclusively. In another variant, the outside diameter ranges from 6.4 mm and 11.0 mm, inclusively. In yet another variant, the tube 1 is part of an IVF straw, and IVF straws are in general made from polymers or copolymers. IVF straws are used for freezing and storing substances such as sperm, eggs and embryos. Commonly used straws are approximately 0.25 ml and 0.5 ml in volume. In a variant, IVF straws have an internal diameter between 1.0 mm and 5.0 mm, inclusively, and more specifically between 1.2 mm and 3.0 mm, inclusively. Some straws may have shapes other than cylindrical shapes such as square, rectangular or possibly others, in which case the inner dimensions provided above may indicate the minimal distance between internal edges of the straw.

A height of the tube 1 may depend on the volume of the tube 1, and is usually between 10 mm and 49 mm without cap, though other heights outside this range are contemplated. In a variant the height of the tube 1 is between 10 mm and 35 mm without cap. In a variant, the volume of the tube 1 is between 0.2 ml and 20.0 ml, inclusively. In another variant, the volume of the tube 1 is between 0.5 ml and 6.0 ml, inclusively. In another variant the volume of the tube 1 is between 0.25 ml and 2.5 ml. In another variant, the volume of the tube 1 is between 0.6 ml and 15.0 ml, inclusively. In another variant, the volume of the tube 1 is between 1.0 ml and 2.8 ml, inclusively. The tube may have internal threading or external threading to receive a cap or may be friction seal type of a configuration for capping the tube (e.g., microcentrifuge tube).

A cap may be sealingly received in the top open end of the tube 1. In an embodiment, it can be said that the cap is an integral part of the tube 1 (i.e., when referring to "tube 1", this may include the cap), but the cap may not be part of the tube 1, or it can be associated with the tube 1 through a plastic band. The cap is typically made of an elastomer or plastic by which the cap is sealingly received and held captive while capping off the tube 1, for the sample in the tube 1 to be isolated from its environment by the cap. The cap may also be a screw cap, for threaded engagement with the tube 1, with appropriate threading (e.g. external or internal threading) being present in the tube 1 and on the cap. Other cap materials may be used, the elastomer being an example among others. The caps might have some other parts associated with it such as a swab or brush linked to the internal portion of the cap for the purpose of swabbing a sample from a patient.

Referring concurrently to FIGS. 2A, 2B, 3 and 4A-4D, a label 10 for the tube 1 is shown at 10. The label 10 may have various layers, such as a facestock 11, printing layer 11B, adhesive layer 12, and support liner 13. The facestock 11 forms the body of the label 10. FIGS. 3 and 4A-4D are schematic illustrations that may not be representative of the actual appearance of the label 10. The curves and thicknesses in FIGS. 4A to 4D may be exaggerated—the label 10 appearing flat in some instances to the naked eye. Moreover, some shading has been added in FIGS. 3 and 4A-4D to assist in distinguishing the layers. However, the shading should not be interpreted as indicating any particular characteristic other than what is described in the present disclosure. For example, the printing layer 11B is shown in different shading in FIGS. 3 and 4A-4D, but the difference in shading may not indicate any difference between the layer 11B of FIGS. 3 and 4A-4D other than what is recited herein.

The facestock 11 is the main layer of the label 10, in that its periphery defines the footprint of the label 10. In use, the facestock 11 is the main exposed layer of the label 10 when applied to a tube 1. The facestock 11 is a polymeric transparent film. For example, the facestock 11 may be any polymer or monomer comprising film such as a thermoplastic film including but not limited to any type or variety of the following films: polyvinyl, polyester a.k.a., polyethylene terephthalate (PET), polypropylene (PP), biaxially oriented polypropylene (BOPP), polyethylene (PE) including various density of polyethylene films (such as Low Density, High Density or any variety of polyethylene films), polyolefin, polystyrene, nylon, polyimide, satin, acrylate or acrylate based films, silicone rubber or any other polymer based material and/or any combination thereof. Also, the facestock 11 may be a thermoset material.

In some variants, a thickness of the facestock 11 may be equal to or less than about 10.0 mil. More specifically, the label facestock 11 may have a thickness of between about 0.3 mil and 6.0 mil, and even more specifically, the facestock 11 may have a thickness of between about 0.4 mil and 4.8 mil, or of between about 0.8 mil and 3.5 mil, or still more specifically, of between about 0.9 mil and 3.2 mil. The possibility of using more than one facestock such as a lamination over the facestock 11 is contemplated.

Figure 4A:
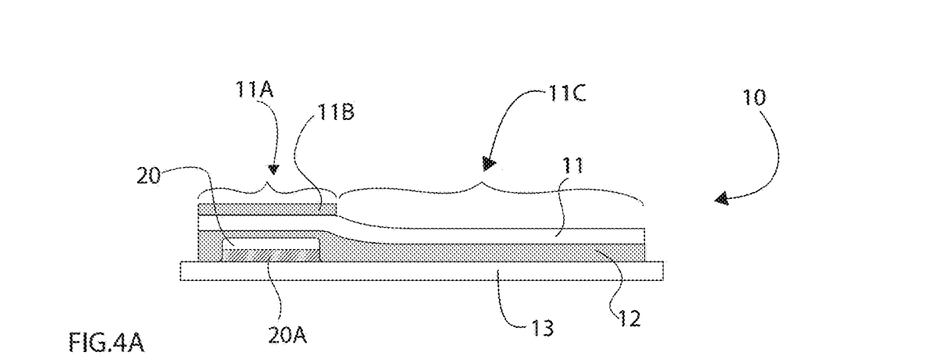
FIG. 4A is a schematic sectional view of the label of FIG. 2, with the RF inlay.
Figure 4B:
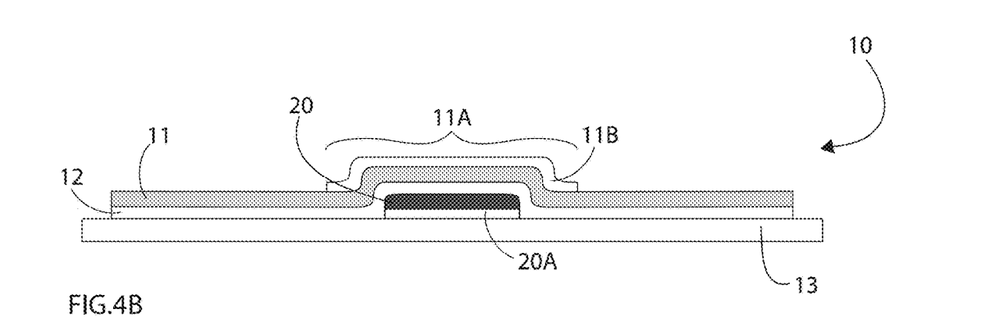
FIG. 4B is a schematic sectional view of the label of FIG. 2, with the RF inlay in another location.

A printable portion 11A of the facestock 11, referred to as printing area, may be coated with a printing layer 11B, on a first surface of the facestock 11, as in FIGS. 4A and 4B. The printing layer 11B may be an opaque ink, such as a white ink, or any other contrasting layer upon which printing may be done. The ink layer 11B may have an additional layer capable of receiving ink such as a top coating, varnish, lamination, another layer of a facestock of any level of opacity, etc. For example, in FIG. 4C, facestock 11 is of the transparent type, and covers the printing layer 11B. The printing layer 11B is provided, with or without its own adhesive layer 11B', to define the printable portion 11A, notably as being an opaque layer for the transparent facestock 11. The printing layer 11B does not receive ink directly thereon (ink is received on the facestock 11), but the printing layer 11B defines the contrast by being opaque, such that data printed on the facestock 11 over the printing layer 11B will be visible. The printing layer 11B may include one or more layers, including transparent (a.k.a., clear) or translucent layers. Ink of the printing layer 11B may be water based, solvent based, emulsion based or any combination thereof. The inks of the printing layer 11B may require no curing or can be curable of any methods including but not limited to Infrared, UV curable, LED UV curable, electron beam (EB) curable, water based inkjet, UV inkjet, laser, liquid electrography, offset, thermal-transfer, direct-thermal, thermochromic, screen printing, laser etchable material, etc.

In some of the embodiments, the printing layer 11B is the surface of the label 10 that can accept ink or printing and this may include printing using a thermal printer, a thermal-transfer printer, a direct-thermal printer, a laser printer, an inkjet printer, a UV inkjet printer, water-based inkjet printer, LED printer, UV printer, impact printer, dot-matrix printer, laser-etching printer, flexographic printer, offset printer, liquid electrography printer, digital printer or a printing press or any other type of printer or device capable of delivering ink on the printing layer 11B. The printing layer 11B may incorporate a thermochromic ink system (such as leuco dye), for example in a layer of coating that is part of the printing layer 11B or incorporated in the material of the printing layer 11B, for the color to be revealed upon heating. In a variant, the ink of the printing layer 11B is a direct thermal printable ink for printing with direct-thermal printers.

As observed from FIGS. 2A-4C, the printing layer 11B covers only portion of the facestock 11, forming the printable portion 11A. A remainder of the label 10, i.e., excluding the printable portion 11A, is a transparent shielding portion 11C. The transparent shielding portion 11C may simply be the transparent facestock 11. The printable portion 11A and the transparent shielding portion 11C occupy opposite ends of the label 10. In an embodiment, as described below, the footprint of the transparent shielding portion 11C is equal or greater than that of the printable portion 11A. The portion 11C may also be smaller than the portion 11A in another embodiment, as long as a total length of the facestock 11 is at least equal to 1.1πD (π used herein being equal to about 3.1416), for the label 10 to overlap itself when on a vial 1 having a diameter D. It can overlap approximately 10% or more of the L1 width of 11A. In an embodiment, it can overlap 100% of the L1 width of 11A. In another embodiment, it can overlap between 10% and 50% of the L1 width of 11A. In another embodiment, it can overlap between 50% and 100% of the L1 width of 11A. In another embodiment, it can overlap more than 100% of the L1 width of 11A by passing over L1 and overlapping L2 width of 11A. The transparent shielding portion 11C may cover any ink on the printable portion 11A to protect the ink.

An adhesive layer 12 is coated on a second surface of the facestock 11, and may also be transparent. The adhesive in the adhesive layer 12 may be any type of adhesive including pressure-sensitive adhesives, and non-limitative examples include a water-based adhesive, acrylic-based adhesive, an emulsion adhesive, a hot melt including a UV hot melt, a rubber-based adhesive, a latex-based adhesive, a solvent-based adhesive, a silicon-based adhesive, a UV-curable adhesive, a LED-curable adhesive including a LED-UV-curable adhesive, a cross-linked adhesive, heat activated adhesive, adhesives for cold-stamping or hot-stamping, any combination thereof, etc. Similarly, in a variant, the adhesive can be permanent, while in another scenario, the adhesive can be removable and/or repositionable, allowing repositioning of the label 10 on the surface to be labelled. The adhesive of the adhesive layer 12 can also be a glove-friendly removable adhesive, for example. It is noted that any pressure-sensitive adhesive could be used. In an embodiment, the adhesive of the adhesive layer 12 can adhere to frozen containers at surface temperature around −72 C or below, with such adhesive being known and available commercially as CryoSTUCK®. The label 10 may have such adhesive as the adhesive layer 12 for uses in biorepositories, tissue and cell banks where the cryogenic vials and containers cannot be thawed when relabelling is required. In an embodiment, the label 10 can be applied to low-energy plastics at a surface temperature between around −25° C. and −40° C. on tube 1 having an outside diameter 13.0 mm or less. In another embodiment, the label 10 can be applied to low-energy plastics at a surface temperature between around −40° C. and −70° C. on tube 1 having an outside diameter 13.0 mm or less. In another embodiment, the label 10 can be applied to low-energy plastics at a surface temperature between around −70° C. and −80° C. on tube 1 having an outside diameter 13.0 mm or less. In another embodiment, the label 10 can be applied to low-energy plastics at a surface temperature between around −80° C. and −100° C. on tube 1 having an outside diameter 13.0 mm or less. In another embodiment, the label 10 can be applied to low-energy plastics at a surface temperature between around −100° C. and −120° C. on tube 1 having an outside diameter 13.0 mm or less. In another embodiment, the label 10 can be applied to low-energy plastics at a surface temperature between around −120° C. and −196° C. on tube 1 having an outside diameter 13.0 mm or less. In another embodiment, the label 10 can be applied to low-energy plastics at a surface temperature at −196° C. or below on tube 1 having an outside diameter 13.0 mm or less. In another embodiment, the label 10 can be applied to low-energy plastics at a surface temperature at around −72° C. to −80° C. on tube 1 having an outside diameter 13.0 mm or less and subsequently immerse the tube 1 into liquid phase or vapor phase liquid nitrogen such as inside Dewar vessel filled with liquid nitrogen. In an embodiment, the adhesive 20A of the RFID inlay is for application to a frozen surfaces as low as around −70° C. In another embodiment, the adhesive 20A of the RFID inlay is for application to frozen surfaces at temperature range between −70° C. and −80° C. The use of RFID tags inside liquid nitrogen tanks immersion into liquid phase and vapor phase liquid nitrogen has been described in U.S. Pat. Nos. 7,350,703, and 10,762,308, both of which are incorporated herein by reference.

In some implementations, the adhesive of the adhesive layer 12 can be weakened or even neutralized at one or more locations using any adhesive neutralizing agent such as a varnish, an ink or UV varnish, a UV ink or the like. The use of pattern coated adhesives, i.e., areas of the material devoid of adhesive, is also contemplated. The use of combinations of adhesives in the same area or in different areas of the label 10 is contemplated.

The adhesive layer 12 may have a thickness equal to or less than about 4.0 mil. More specifically, the adhesive layer 12 could have a thickness of between about 0.05 mil and 2.0 mil, and even more specifically, the adhesive layer 12 could have a thickness of between about 0.4 mil and 1.5 mil, or of between about 0.6 mil and 1.2 mil, or still more specifically, of between about 0.7 mil and 1.0 mil.

A support liner 13, also known as a release, a release liner, a silicone liner, a backing or a liner, may also be provided, from which the adhesive 12 with the facestock 11 can be released. For example, the support liner 13 may include a release coating, such as a silicon coating on which the adhesive 12 is harboured. Any other coatings facilitating the release of the adhesive may be used instead of silicone. The release liner 13 may be paper based, or polymer based, with contemplated polymers including a polyester (PET), polypropylene (PP), bi-axially oriented polypropylene (BOPP) or any other type of a polymer. For example, the release liner 13 may be a silicone or fluorosilicone coated support on which the adhesive layer 12 is harboured or retained, though other materials can be used, including waxes or other adhesive release coatings, etc, on a substrate. For example, if the support liner 13 is paper based, a low friction coating (e.g., silicone, fluorosilicone, or non-silicone based release coating) may be present to facilitate the peeling off of the facestock 11 and adhesive layer 12 from the support liner 13. Accordingly, when the release liner 13 is removed, the facestock 11 may be adhered to the vial surface, by the adhesive layer 12. In another embodiment, the release liner 13 may have imaging properties meaning that the manual writing with a pen or a pencil or with any type of impact instrument or impact printer can create a copy of the image on the release liner 13. In this case, when the facestock 11 is removed from the liner 13, the copy of the printed information or the image remains on the release liner 13 similar to carbon-copying. In another embodiment, the label 10 may be linerless. The support liner 13 may have a surface coating (a.k.a., release coating) or any low adherence surface or feature, upon which the adhesive layer 12 is laid, to facilitate the separation of the facestock 11 and adhesive layer 12 from the support liner 13. Other features associated with the liner 13 may be as described in U.S. patent application Ser. No. 17/092,719, filed on Nov. 9, 2020 and incorporated herein by reference, such features including the presence of a slit in the liner 13 to facilitate the peeling of the removable liner 13 and the application of the label 10 to a tube 1.

Referring to FIGS. 2A, 2B and 4A-4D, an RF (radio frequency) inlay 20 is adhered to the adhesive layer 12, in the printable portion 11A of the label 10. The RF inlay 20 is designed for wireless communications, and may have all necessary components for such purpose, including the capacity in some embodiments to be encoded. The expression RF inlay and wireless communication inlay are used to indication any wireless communication device for label, including RF tag, chip, electronic chip, RFID, RFID label, Radio Frequency identification tag, NFC tag, Near Field Communication tag, HF (high frequency radio frequency), UHF (ultra high frequency radio frequency), NFC label, transponder, wireless communication device of any appropriate frequency, to name only a few of the numerous appellations possible for the RF inlay 20. For consistency, the expression RF inlay will be used herein. The RF inlay 20 may typically include a circuit component, for example circuitry, with an antenna, inlaid in a casing. The casing may be made of any appropriate material, such as polyester, polypropylene, Biaxially Oriented Polypropylene (BOPP), polyethylene or any other polymer based material. The casing may be defined as a laminated layer(s) of film, whether transparent or not. The RF inlay 20 may include a wireless communication component or may be configured to communicate wirelessly by technologies such as RFID (Radio Frequency Identification), NFC (Near Field Communication), Bluetooth®, or other type of wireless communication tags, sensor, electronic component, etc. The RF inlay 20 can be of any shape such as a square (as shown), rectangle, circle, oval, trapezoid, triangle, polygon, as an example. Any of the shapes may have straight or rounded corners. The term RF in the present disclosure implies the use of any wireless communication device that may have an electronic component capable of receiving or transmitting any type of wireless communication of any frequency or comprising any data that can be accessed or transmitted wirelessly, whether passively or actively i.e., without or with battery respectively.

Figure 2A:
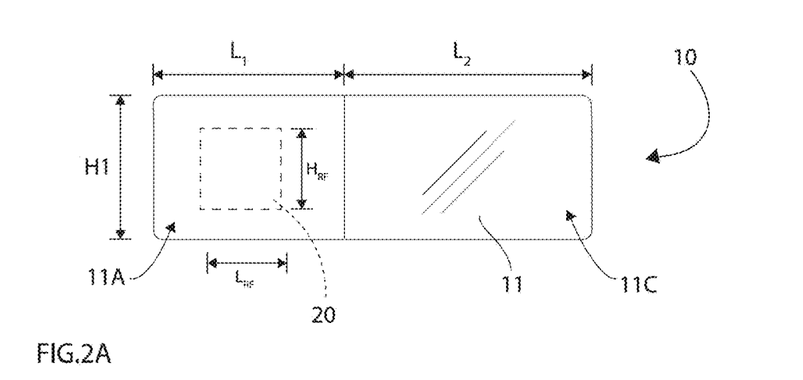
FIG. 2A is a face view of a label with wireless communication capability for use with the vial or tube of FIG. 1.
Figure 2B:
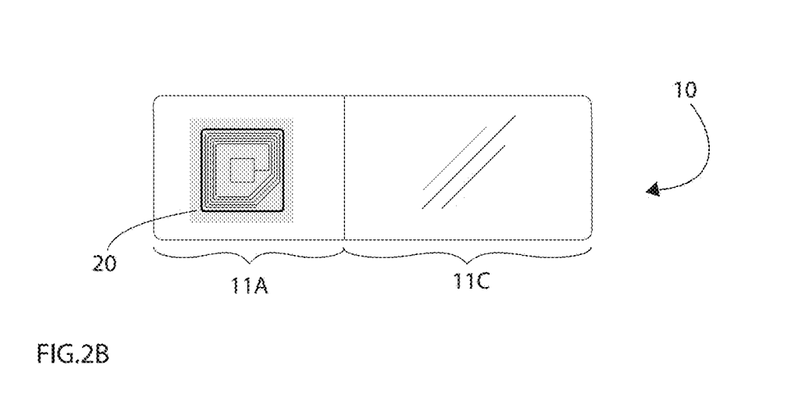
FIG. 2B is a rear view of the label with wireless communication capability for use with the vial or tube of FIG. 1.
Figure 3:
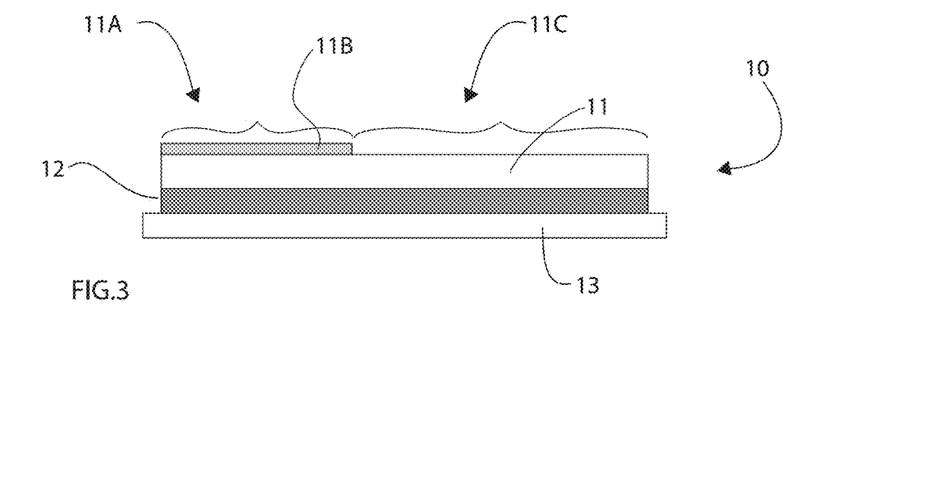
FIG. 3 is a schematic sectional view of an exemplary construction of the label of FIG. 2, prior to insertion of an RF inlay.

The RF inlay 20 may optionally include an adhesive layer 20A, i.e., it may be a wet tag (with the adhesive layer 20A) or dry tag (without the adhesive layer 20A). FIG. 2B is provided to be illustrative of both a wet tag and a dry tag configuration for the RF inlay 20. The adhesive in the adhesive layer 20A may be any type of adhesive including pressure-sensitive adhesives, and non-limitative examples include a water-based acrylic, an emulsion adhesive, a hot melt including a UV hot melt, a rubber-based adhesive, a latex-based adhesive, a solvent-based adhesive, a silicon-based adhesive, radiation curable adhesive, heat-curable adhesive, a UV-curable adhesive, a LED-curable adhesive including a LED-UV-curable adhesive, a cross-linked adhesive, heat activated adhesive, adhesives for cold-stamping or hot-stamping, any combination thereof, etc. Similarly, in a variant, the adhesive can be permanent, while in another scenario, the adhesive can be removable and/or repositionable, allowing repositioning of the RF inlay 20 on a surface. The adhesive of the adhesive layer 20A can also be a glove-friendly removable adhesive, for example. It is noted that any pressure-sensitive adhesive could be used. If present, the adhesive layer 20A may have a thickness equal to or less than about 6.0 mil. More specifically, the adhesive layer 20A could have a thickness of between about 0.05 mil and 3.0 mil, and even more specifically, the adhesive layer 20A could have a thickness of between about 0.4 mil and 2.0 mil, or of between about 0.6 mil and 1.5 mil, or still more specifically, of between about 0.7 mil and 1.0 mil, or still more specifically, of between about 0.5 mil and 1.2 mil. The facestock 11 may be coated with a different adhesive than the RF inlay adhesive 20A or both adhesives may be the same. Moreover, although not shown, the RF inlay 20 may come on a release liner at some point before being adhered onto the adhesive layer 12 as in FIGS. 2A, 2B and 4A-4D. The RF inlay 20 may have a tamper-evident feature meaning that it may disrupt at least one of its components upon an attempt to remove it which will result a dysfunction of the RF inlay 20. As a variant both the adhesive label 10 and the RF inlay 20 may have a tamper-evident feature incorporated meaning that upon attempt to remove the label 10 it may leave an evidence of the attempt of tampering.

Figure 4C:
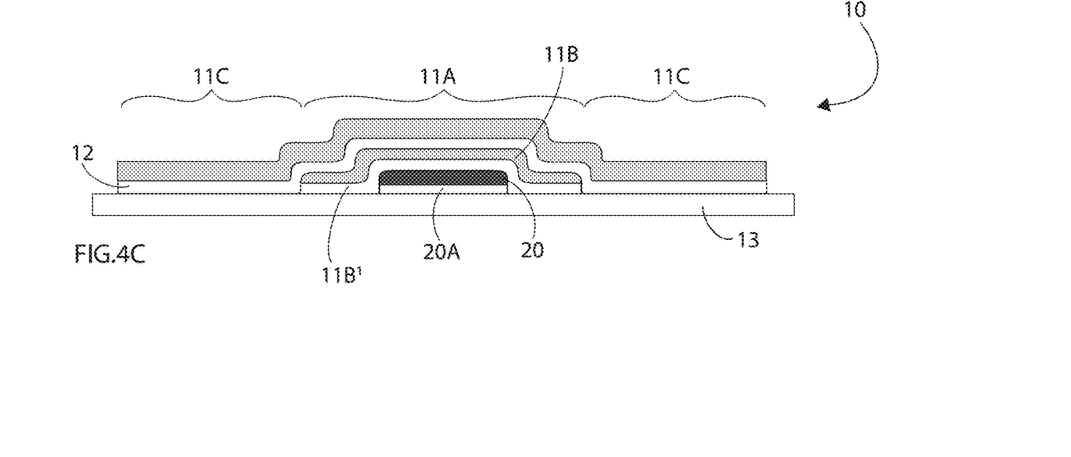
FIG. 4C is a schematic section of a label with RF inlay in accordance with another embodiment of the present disclosure.
Figure 4D:
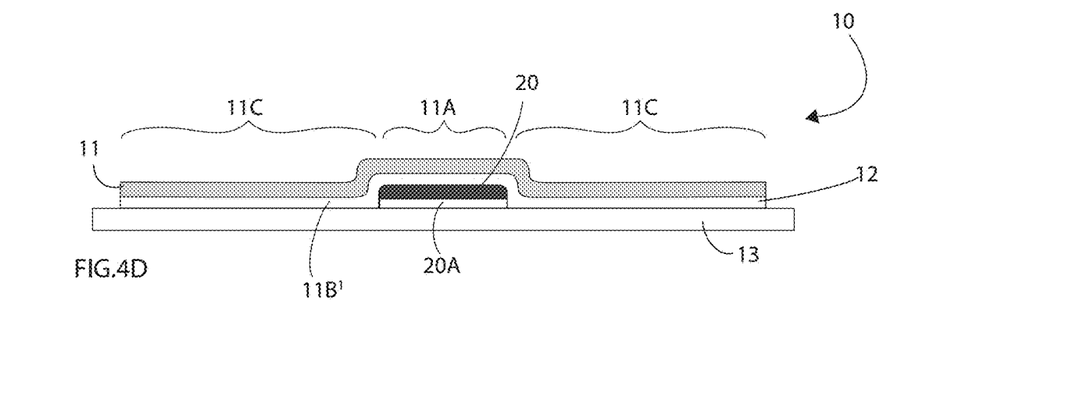
FIG. 4D is a schematic section of a label with RF inlay in accordance with yet another embodiment of the present disclosure.

As a variant, shown in FIG. 4D, the RF inlay 20 may be encapsulated in a white or opaque polymeric film that may define the printable zone 11A, with the facestock 11 being entirely transparent. Stated differently, the RFID inlay 20 is encapsulated in an opaque envelope in which case the facestock 11 may be fully transparent and the printable area would be visible or demarcated due to the opacity of the RFID envelope beneath facestock 11, although the printing will be on the surface of the transparent facestock 11, in a similar arrangement as in FIG. 4C. In such a case, information will be printed on or in the facestock 11, but the background will appear opaque due to the opacity of the casing of the RF inlay 20. Hence, FIG. 4D shows that there may not be any ink layer printed on the facestock 11. In FIGS. 2A and 4A, FIGS. 2A and 4A have the printable zone 11A (a.k.a., printable area) to a side of the label 10, while FIGS. 4B, 4C, 4D have the printable zone 11A is centered or with segments of the transparent shielding portion 11C being on either side of the printable zone 11A. As a variant, the printable zone 11A and the RF inlay 20 may not be centered, and may be positioned at any distance from either edge of the label 10. The reverse arrangements are also considered, for example with the embodiments of FIGS. 4B to 4D having the printable zone 11A to one side, or the embodiment of FIG. 2A/4B being between the transparent shield portions. Moreover, in FIGS. 4A-4D, the adhesive layer 20A is shown as part of the RF inlay 20, but may be absent.

Figure 5:
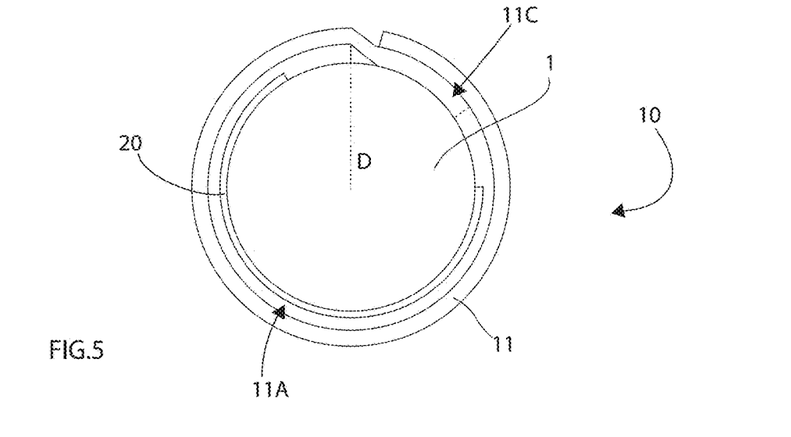
FIG. 5 is a schematic view showing the label with electronic chip of FIG. 1, as applied to a vial or tube.

Referring to FIG. 5, the label 10 with the RF inlay 20 is shown as applied to the cylindrical surface of tube 1. FIG. 5 is schematic, in that the printable portion 11A and/or the shielding portion 11C may be shorter or longer than what is illustrated. The RF inlay 20 may be with or without the adhesive layer 20A. In an embodiment, data has been printed on the printing layer 11B of the printable portion 11A, and the RF inlay 20 is adhered to the adhesive layer 12 of the printable portion 11A. The RF inlay 20 may have a unique identification number assigned upon manufacturing. It may also have been encoded or pre-encoded. The label 10 is applied to the cylindrical surface of the tube 1 by its end including the printable portion 11A first, and wrapped around the cylindrical surface. Due to its relative rigidity, the RF inlay 20 may not be in conforming contact with the cylindrical surface of the tube 1. Moreover, if the RF inlay 20 does not have an adhesive layer 20A, the footprint of the printable portion 11A adhered to the cylindrical surface of the tube 1 may exclude the footprint of the RF inlay 20. However, the length of the label 10 is such that the transparent shielding portion 11C of the label 10 covers the printable portion 11A when wrapped around the tube 1. For example, when used with the corresponding size of tube 1, the printable portion 11A may at most overlap itself slightly, or cover exactly the circumference of the tube 1. The printable portion 11A may more particularly cover less than a circumference of the tube. The printable portion 11A is sized such that the overlap does not result in printing being covered by the printable portion 11A. On the other hand, the transparent shielding portion 11C has length sufficient to be overlaid over most or all of the printable portion 11A. This may include coverage of all of the segment of the printable portion 11A featuring the RF inlay 20. Therefore, the printing layer 11B is shielded by the transparent shielding portion 11C. The transparent shielding portion 11C may also apply additional adhesion force onto the segment of the printable portion 11A featuring the RF inlay 20, and may force the RF inlay 20 into conforming to the cylindrical surface of the tube 1.

Therefore, referring now to FIG. 2A, dimensions of the label 10 are provided. The dimensions of the label 10 are shown as a function of the dimensions of the tube 1, such as the outer diameter D. While FIG. 2A has the printable zone 11A to one side of the label 10, the following dimensional ratios also apply to embodiments in which the printable zone 11A is centered, with segments of the transparent shielding portion 11C being on either side of the printable zone 11A, as in FIGS. 4B to 4D. Accordingly, when the label 10 is to be used with a tube 1, the label 10 may be selected by a user as a function of the outer diameter D, to achieve the coverage described above for FIG. 5. The dimensions are expressed in height and length, with the label 10 being wrapped in length on the tube 1, and the height generally parallel to a central axis of the tube 1.

The length $L_1$ of the printable portion 11A may be expressed as:

$$0.8\pi D < L_1 < 1.3\pi D$$

The relative lengths of the printable portion 11A and of the transparent shield portion 11C may be expressed as:

$$L_1 \leq L_2 \leq 2.5\, L_1$$

The length $L_2$ of the transparent shield portion 11C, which length $L_2$ is the cumulative length of the two segments for the embodiments of FIG. 4B-4D (or of FIG. 4A if arranged to have two segments) may be expressed as:

$$\pi D < L_2 < 3.5\pi D$$

Variations may exist for length $L_2$ of the transparent shield portion 11C, such as the two variants expressed as:

$$0.5\pi D < L_2 < 2\pi D$$

$$1.5\pi D < L_2 < 3\pi D$$

The total length of the label 10, $L_1 + L_2$ is:

$$1.8\pi D \leq (L_1 + L_2) \leq 3.5\pi D$$

In an embodiment, if it is not intended that the transparent shielding portion 11C cover the RF inlay 20 and/or printable portion 11A, the total length of the label 10, $L_1 + L_2$ may be as small as $1.1\pi D$ $(L_1 + L_2)$ With respect to the RF inlay 20, the following dimensions may apply:

$$H_{RF} \leq H_1 \leq 1.5 H_{RF}$$

$$L_{RF} \leq L_1 \leq 1.5 L_{RF}$$

In another variant, the height $H_1$ of the label 10 is selected based on the dimensions of the tube 1. For example, $H_1$ may be between 6.0 mm and 100.0 mm. In another variant, the height $H_1$ of the label 10 may be between 10.0 mm and 30.0 mm. In yet another variant, the height $H_1$ of the label 10 may be between 12.0 mm and 70.0 mm. In yet another embodiment, the height $H_1$ of the label 10 is between 15.0 mm and 64.0 mm. In yet another embodiment, the height $H_1$ of the label 10 is between 12.0 mm and 26.0 mm.

Although the dimensions provided below have the transparent shield portion 11C capable of covering a full circumference, it may also be possible to have shorter shield portion 11C, such as just enough to have an overlap of the label 10 on itself. For example, in the case of low surface energy polymers for the tubes 1, it may be desired to have an adhesive to facestock bonding as a result of the overlap for more secure attachment of the RF inlay 20 to the tube 1. For example, if $L_1$ is equal to the circumference C, then $L_2$ may be 10% or more of $L_1$ to have sufficient overlap on $L_1$. If $L_1$ is less than the circumference then the $L_2$ should be longer in order to achieve the 10% coverage of $L_2$, for the total length of the label 10 to be at least $1.1\pi D$.

Figure 6A:
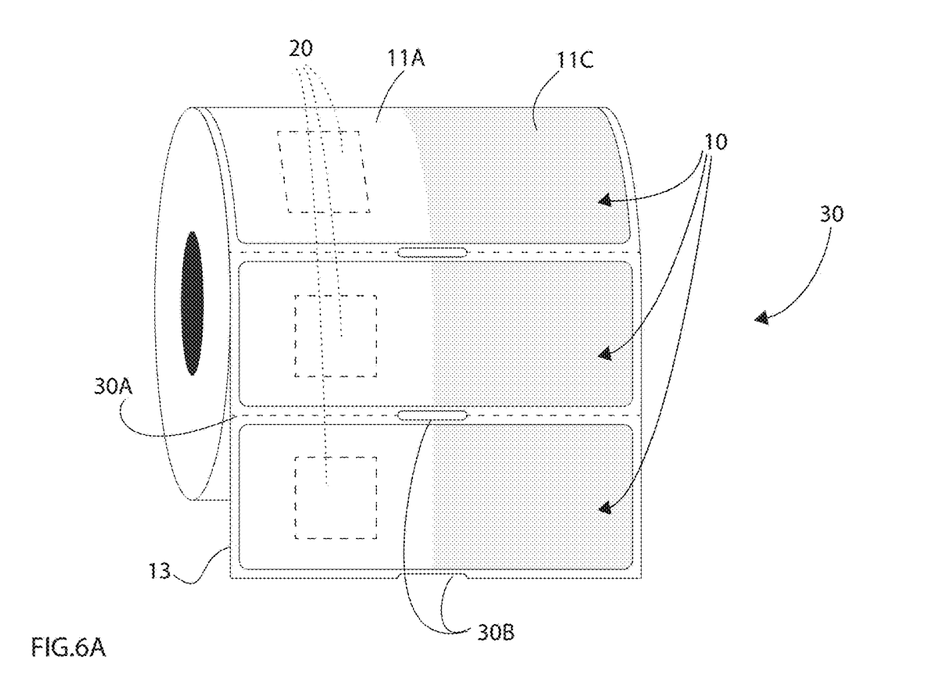
FIG. 6A is a perspective view of a series of the label of FIG. 2, in a roll, in accordance with another embodiment of the present disclosure.
Figure 6B:
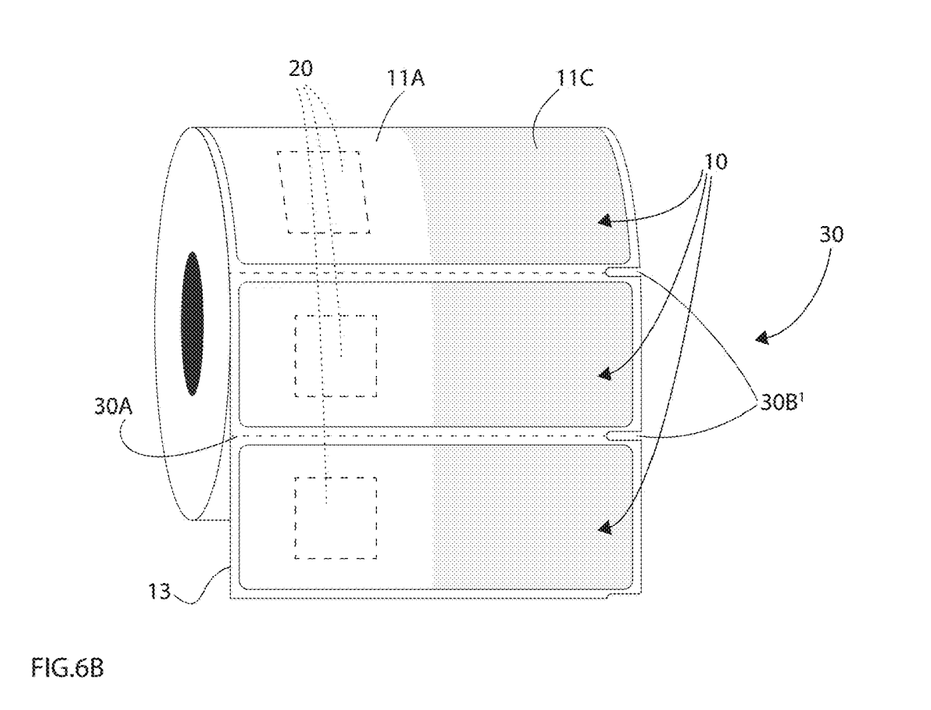
FIG. 6B is a perspective view of a series of the label of FIG. 2, in a roll, in accordance with yet another embodiment of the present disclosure.
Figure 7:
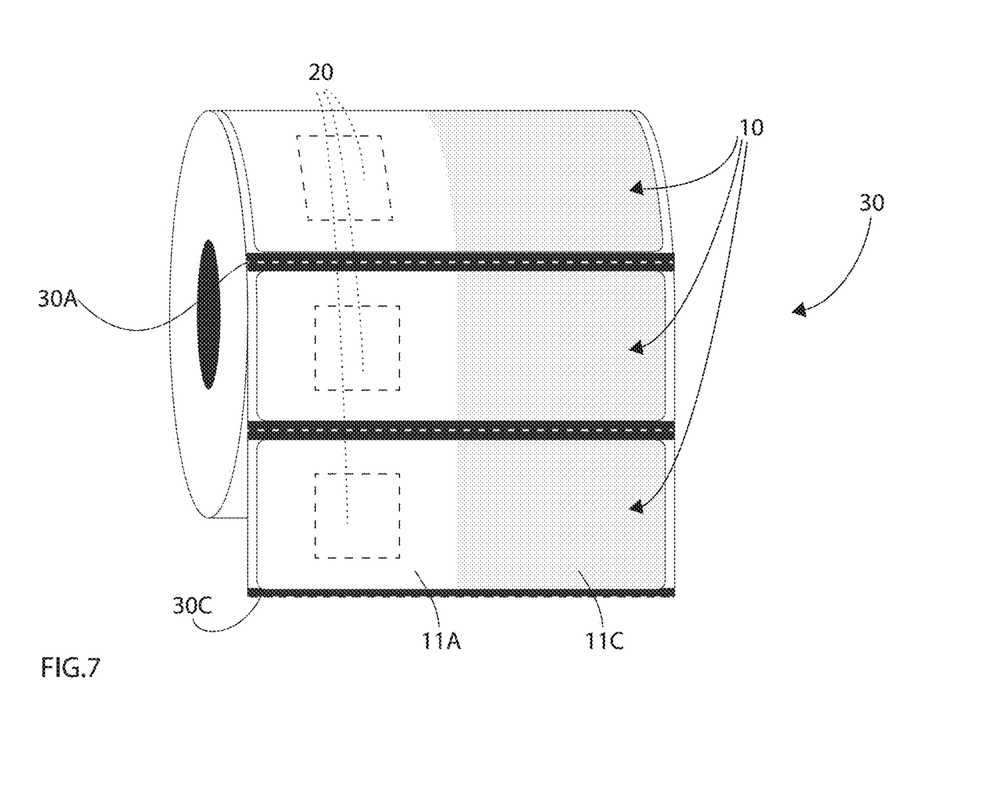
FIG. 7 is a perspective view of a series of the label of FIG. 2, in a roll, in accordance with yet another embodiment of the present disclosure.
Figure 8:
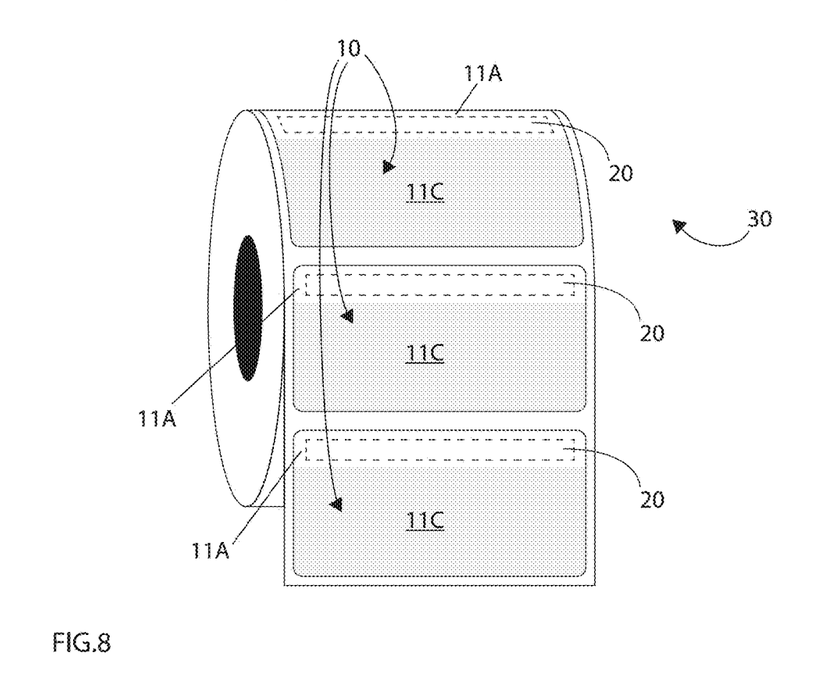
FIGS. 8 to 11 are perspective views of a series of the label of FIG. 2, in a roll, with different shapes, such as for use with IVF straws.
Figure 9:
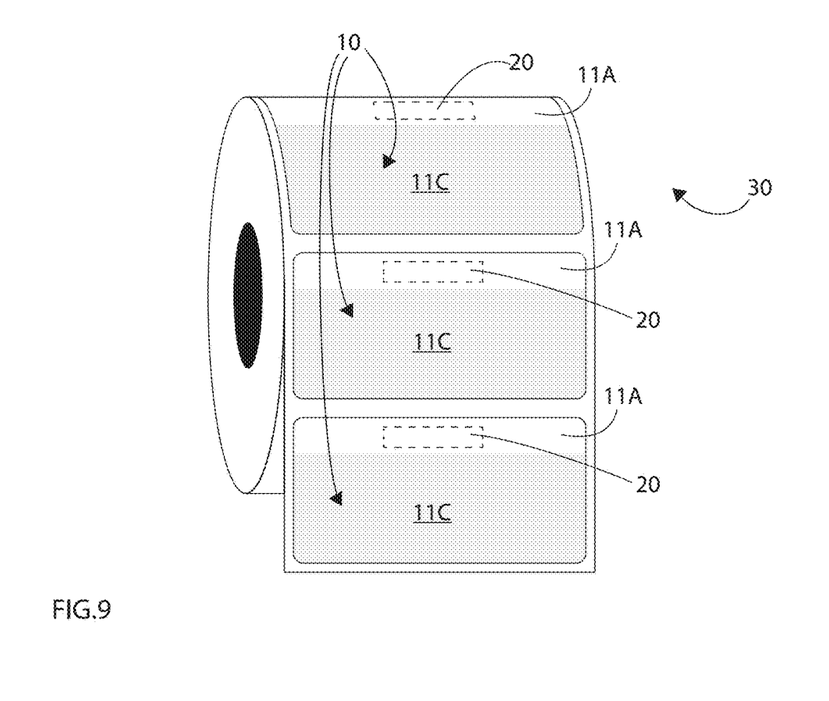
Figure 10:
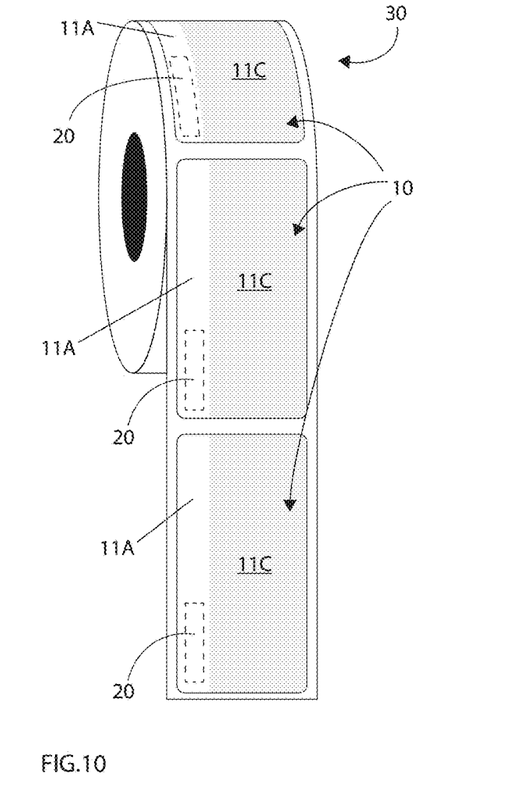
Figure 11:
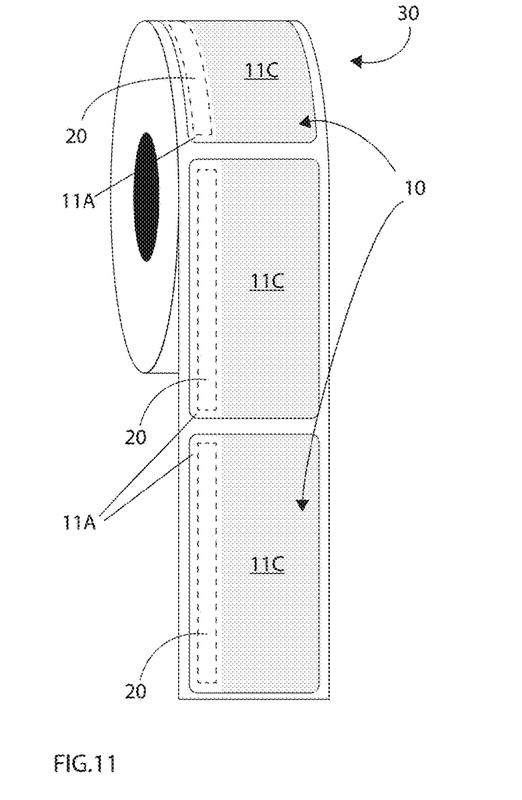

Referring to FIGS. 6A, 6B and 7, a plurality of the labels 10 are shown on a common release liner 13, the release liner 13 being in the form of a roll 30. As other embodiments, the release liner 13 may be in the form of a sheet (such as a letter size 8.5"×11" or A4, or other sheet format) with rows and columns of the labels 10, or in the form of flat strips with rows of the labels 10, booklet, fanfold, etc. In an embodiment, when the labels 10 are intended for printing in a laser printer, a LED printer or any other type of printer in a sheet format, the release liner 13 may be resistant to heat without curling when it is passed through such a printer. Such release liners are also known as "layflat" liners. In some cases the layflat liners are thicker than regular release liners, and may be for example up to 7.0 mil in thickness. In an embodiment the labels shown in FIG. 6A, 6B and/or 7 may be in a vertical orientation such as the RF inlay 20 or opaque portion may be fed first. Often when the labels are applied using automatic label applicators or robotic devices the orientation of the label feeding may change depending on the application device requirements and cryo container positioning.

When in a roll 30, as in FIGS. 6A, 6B and 7, tear lines 30A may be provided to separate the liner 13 in segments. For example, the tear lines 30A may be formed in the liner 13 between each label 10, such that a label 10 and its associated portion of liner 13 may be detached from the roll 30, or from a sheet, booklet, fanfold or any other format of label 10 and liner 13. As a variant the perforation lines 30A may be absent.

Referring to FIG. 6A, cut-outs 30B may be provided in the liner 30, at repeated intervals. For example, the cut-outs 30B may disrupt the tear lines 30A as shown in FIG. 6A. The cut-outs 30B serve as a visual or optical marker for a printer (a.k.a., notch, label position indicators), to locate the labels 10 when printing from the roll 30. In FIG. 6B, notches 30B' are shown and used as another possible label position indicator. The notch for visual or optical detection by the sensor of the printer may be located in any area of the roll depending the position of the sensor in the printer (whether a dynamic or static sensor printer is used). FIG. 7 shows an embodiment that differs from that of FIGS. 6A and 6B in that the visual marker is in the form of a contrasting line 30C (a.k.a., black mark, mark sensing lines). The contrasting lines 30C may have a color or tone contrasting from its surroundings, to be detected optically by a sensor of the printer. Stated differently the contrasting lines 30C serve as a marker for a printer, to locate the labels 10 when printing from the roll 30. The contrasting lines may be of different length covering entirely the width of the roll or the label or they may only partially cover the width of the roll or the label. Depending on the type of printer or a printing device there may be other types of contrasting lines or contrasting shapes (e.g., square, rectangle, etc) that may be located any place on the underside of the roll that provide a detection of the label by the sensor of the printer. In an embodiment, the cut-outs 30B, notches 30B' and/or contrast lines 30C may not be present in which case the sensor of the printer may be located under the location of the printing portion 11B (opaque print area) or printable portion 11A to detect the labels by the detecting the opacity of the 11B.

The label 10 as described hereinabove is shown having different proportions in FIGS. 8 to 11, which proportions may be suited for use on elongated objects with small cross-sectional diameters, such as IVF straws. The RF inlays 20 may be elongated as well, depending on their sizes. Different orientations are contemplated for the labels 10 on the roll 30, as observed from FIGS. 8 to 11. Moreover, the labels 10 of FIGS. 8-11 may be on individual liners, on a sheet, etc. The labels 10 of FIGS. 8-11 have a height H1 (in reference to FIG. 2A) that is at least three times greater than L1. In an embodiment, the height of RFID inlay 20 may be between 3.8 mm and 8.0 mm, inclusively. In another embodiment, the height of the RFID inlay may be between 6.0 mm and 7.0 mm, inclusively.

In an embodiment, a method for applying the label 10 with RF inlay 20 onto tube 1 may include one or more of: adhering an end of the label 10 against a cylindrical surface of tube 1, the end having the printing surface 11A and RF inlay 20; wrapping the label 10 around the cylindrical surface of the tube 1; applying transparent shielding portion 11C of the label 10 over the end having the printing surface 11A and the RF inlay 20. When applying the transparent shielding portion 11C of the label 10 over the end having the printing surface 11A and the RF inlay 20, there may occur addition deforming or conforming of the RF inlay 20 to the cylindrical surface of the tube 1. Upon applying a first part of the label 10, the user may slightly stretch the manipulated end(s) to achieve some tension during the wrapping process to achieve a stronger adhesion Other steps may include: printing on the printing surface 11A prior to adhering the end of the label 10 against the cylindrical surface of the tube 1; removing the label 10 from a release liner 13 prior to adhering the end of the label 10 against the cylindrical surface of the tube 1. Adhering an end of the label 10 against a cylindrical surface of the tube 1 may include adhering the end of the label 10 to a frozen tube, such as a cryogenically frozen tube.

The printing in the printable portion 11A may be done prior to the insertion of the RF inlay 20 onto the adhesive layer 12 or after the insertion. The location of the printable portion 11A and RF inlay 20 can be different than in any of the previous figures. For example, the printable portion 11A and the RF inlat 20 may occupy a central position on the label 10 as shown in FIGS. 4B-4D, in which case the printable portion 11A of the label 10 may be applied first to the tube 1 and the two transparent shield portions 11C extending from each side of the printable portion 11A will wrap over each other, securing the RF inlay 20 on the tube 1.

In an embodiment, the label 10 comes in a kit. The kit may include one or more of the labels 10 with the RF inlay 20, such as labels 10 on the release liner 13, in a roll 30, sheet, booklet, fanfold, and one or more tubes 1. In the kit, labels 10 may be pre-applied to the tubes 1, or provided detached. The kit may also include the presence of a liquid or other substance in the tube 1. Some or all of the components of the kit may be sterile (i.e., sterilized) as an option. The labels 10 can be provided blank or pre-printed, and/or may be with any background color or color indicator such as thermochromic ink, and/or image, and/or information and/or barcode and/or alphanumeric markings, and/or indicia etc. The electronic chips 20 may be preprogrammed or programmed via a wireless encoding device or a wireless encoding printer such as RFID printer/encoder. RFID printer may be of any type such as thermal-transfer, direct thermal, LED, laser, inkjet, UV etc. which can print data, images, indicia, graphics and encode the RF inlays.

In addition to the embodiments shown herein, the label 10 can be positioned in any orientation on a roll or sheet, such as landscape, portrait, vertical, with any appropriate angle. An orientation can be provided to facilitate automatic peeling from a peeling device, and/or label applicator device or from a robotic device. Label 10 can be used in any robotic device that may include modules such as a printer, an RF encoder, a peeler, an applicator or any an other module for manipulation or combination thereof. The label 10 may be suitably used in cryogenic storage, in one contemplated use among others, for instance in a manner described in U.S. Pat. No. 10,762,308, and entitled "Method and system for Wireless Identification of Samples in Cryogenic Liquid Storage", the contents of which are incorporated by reference. The RFID tags may be encoded with specific information, such as described in U.S. Pat. No. 7,350,703 and entitled "Low temperature radio frequency identification tracking system", the contents of which are incorporated herein by reference.

The RF inlay 20 may have a memory, that may be any of a TID (Tag Identifier) memory may encode the unique identification number of the RF inlay 20; EPC (Electronic Product Code); USER memory allowing the user to encode and read information; RESERVED memory is for locking the read and write functions of the RF inlay 20. It is contemplated that the label 10 covers any possible form of RFID memory or functions, or any other wireless chips of any appropriate frequency (e.g., NFC, UHF, HF, radiowave).

The label 10 may thus be described as having a transparent facestock; a printing area on a first surface of the transparent facestock, the printing area configured to receive data thereon, the printing area covering only a portion of the transparent facestock, whereby a shielding portion of the length of the label is transparent; an adhesive layer on a second surface of the facestock, an RF inlay adhered to the adhesive layer in a portion of the label corresponding to the printing area; wherein the printing area and the facestock are sized for the shielding portion to overlap at least partially the printing area when the label is wrapped on a tube. The printing area may be the facestock itself, such as with an contrasting opaque portion under it, or may be an opaque layer in the facestock, as possible embodiments.

The label 10 may be applied to an IVF straw for a storage inside liquid phase or vapor phase liquid nitrogen. Also, the label 10 may be applied to a tube for storage inside liquid phase or vapor phase liquid nitrogen, or for storage inside ultra-low temperature freezers in temperature range from −70 C to −196 C, and/or dry ice.

The label configurations and methods described hereinafter may be used in any industry where labels are used. Some implementations of the label configurations and methods may further be particularly well suited for use in certain industries. In particular, the labels used in some industries— such as in biotechnology, biomedicine, cell banking, tissue banking and other fields involving cryogenic bio-preservation or freezing of biological specimen—are typically required to be thinner and more flexible than in other fields and are therefore substantially more difficult to peel using prior art methods. Cryogenic application for the sake of the present disclosure is at −70 C and below. Specifically storage in liquid phase of liquid nitrogen at −196 C, storage in vapour phase of liquid nitrogen, freezers with temperature at −70 C, −80 C, −120 C or below, and/or in dry ice. In some applications, the labels 10 may be used in condition in which they are contacting liquid helium at −269 C. Storage or use of other liquified gases in storing or contacting labels is contemplated For example, it has been shown that cryogenic label materials that are intended for use at −80 C and below such as inside liquid nitrogen tanks at −196 C or below or that are exposed to liquid helium at −269 C may have facestock elongation values between 10% and 500% or even more. In a variant, an elongation value of facestock 11 is at least 20% higher than an elongation value of the RF inlay 20, for the facestock 11 to adapt to temperature variations when stored at freezing temperatures, such as cryogenic temperatures. It will however be understood that the label configurations and methods described hereinafter are not limited to use in these fields, and may be used instead in other fields such as packaging, automotive, electrical, electronics, avionics, aerospace, food, chemical, agricultural, fashion, gas and oil, plumbing, heavy industrial, light industrial, construction, or any other suitable filed or industry.

The invention claimed is:

1. A label for a tube having a diameter D, comprising:
a transparent facestock, the transparent facestock having a first surface defining a top side of the transparent facestock, and a second surface defining an underside of the transparent facestock;
a printing area on the first surface of the transparent facestock, the printing area configured to receive data thereon, the printing area being a printing layer added onto the first surface of the transparent facestock and covering only a portion of the transparent facestock, the printing layer configured to display printing when printed on, whereby a shielding portion of the length of the label is transparent;
an adhesive layer on the second surface of the facestock; and
a wireless communication inlay directly adhered to the adhesive layer in a portion of the label corresponding to the printing area;
wherein the printing area and the facestock are sized for the shielding portion to overlap at least partially the printing area when the label is wrapped on a tube.

2. The label according to claim 1, wherein the printing layer is defined by opaque ink.

3. The label according to claim 1, further including a release liner.

4. The label according to claim 3, wherein the release liner is a sheet having multiple ones of the label thereon.

5. The label according to claim 3, wherein the release liner is a roll having multiple ones of the label thereon.

6. The label according to claim 1, wherein the wireless communication inlay is part of a wet tag.

7. The label according to claim 1, wherein the wireless communication inlay is part of a dry tag.

8. The label according to claim 1, wherein the shield portion has a length $L_2$ being $\pi D < L_2 < 3.5\pi D$.

9. The label according to claim 1, wherein the printing area has a length $L_1$ being $0.8\pi D < L_1 < 1.3\pi D$.

10. The label according to claim 1, wherein the label is configured for storage at −70C or below.

11. The label according to claim 1, wherein the label is configured for contact with liquid nitrogen.

12. The label according to claim 1, wherein the label is configured for contact with dry ice.

13. The label according to claim 1, wherein the adhesive layer is a cryogenic adhesive capable to adhere to frozen vials or vials frozen at at least −70C.

14. The label according to claim 1, wherein an elongation value of facestock is at least 20% higher than an elongation value of the wireless communication inlay.

15. The label according claim 1, wherein the printing area on a first surface of the transparent facestock includes an opaque ink layer on the first surface of the transparent facestock.

16. An assembly comprising:
a label having
a transparent facestock, the transparent facestock having a first surface defining a top side of the transparent facestock, and a second surface defining an underside of the transparent facestock,
a printing area on the first surface of the transparent facestock, the printing area configured to receive data thereon, the printing area being a printing layer added onto the first surface of the transparent facestock and covering only a portion of the transparent facestock, the printing layer configured to display printing when printed on, whereby a shielding portion of the length of the label is transparent,
an adhesive layer on the second surface of the facestock, and
a wireless communication inlay directly adhered to the adhesive layer in a portion of the label corresponding to the printing area; and
an IVF straw;
wherein the printing area and the facestock are sized for the shielding portion to overlap at least partially the printing area when the label is wrapped onto the IVF straw.

17. A method for applying a label with RF inlay onto a tube, comprising:
adhering an end of a label against a cylindrical surface of a tube, the end having a printing layer added onto a first surface defining a top side of the label, and a wireless communication inlay on a second surface defining an underside of the label, the printing layer configured to display printing when printed on;
wrapping the label around the cylindrical surface of the tube; and
applying the second surface of a transparent shielding portion of the label over a first surface of the end having the printing surface and the wireless communication inlay, such that the second surface of the transparent shielding portion is applied directly against the printing surface.

18. The method according to claim 17, including printing on the printing surface prior to adhering the end of the label against the cylindrical surface of the tube.

19. The method according to claim 17, including removing the label from a release liner prior to adhering the end of the label against the cylindrical surface of the tube.

20. The method according to claim 17, wherein adhering an end of a label against a cylindrical surface of a tube includes adhering the end of the label to a frozen tube.

* * * * *